United States Patent
Lederer et al.

(10) Patent No.: US 10,313,745 B2
(45) Date of Patent: Jun. 4, 2019

(54) ADAPTIVE STREAMING OF AN IMMERSIVE VIDEO SCENE

(71) Applicant: bitmovin GmbH, Klagenfurt (AT)

(72) Inventors: Stefan Lederer, Klagenfurt (AT); Christopher Mueller, Villach (AT); Reinhard Grandl, Maria Rain (AT)

(73) Assignee: bitmovin GmbH, Klagenfurt (AT)

( * ) Notice: Subject to any disclaimer, the term of this patent is extended or adjusted under 35 U.S.C. 154(b) by 0 days.

(21) Appl. No.: 15/459,354

(22) Filed: Mar. 15, 2017

(65) Prior Publication Data

US 2017/0374411 A1   Dec. 28, 2017

Related U.S. Application Data

(60) Provisional application No. 62/279,810, filed on Jan. 17, 2016.

(51) Int. Cl.

| | |
|---|---|
| *H04N 21/44* | (2011.01) |
| *H04N 21/437* | (2011.01) |
| *H04N 21/8543* | (2011.01) |
| *H04N 21/845* | (2011.01) |
| *H04N 21/8545* | (2011.01) |
| *H04N 21/658* | (2011.01) |
| *H04N 21/462* | (2011.01) |
| *H04N 21/81* | (2011.01) |

(Continued)

(52) U.S. Cl.
CPC .......... *H04N 21/44* (2013.01); *H04N 13/117* (2018.05); *H04N 13/189* (2018.05); *H04N 13/194* (2018.05); *H04N 21/437* (2013.01); *H04N 21/462* (2013.01); *H04N 21/6581* (2013.01); *H04N 21/816* (2013.01); *H04N 21/845* (2013.01); *H04N 21/8456* (2013.01); *H04N 21/8543* (2013.01); *H04N 21/8545* (2013.01); *H04N 2213/006* (2013.01)

(58) Field of Classification Search
CPC .............. H04N 21/44; H04N 13/0014; H04N 13/0055; H04N 13/0059; H04N 21/437; H04N 21/462; H04N 21/6581; H04N 21/816; H04N 21/845; H04N 21/8543; H04N 21/8545

See application file for complete search history.

(56) References Cited

U.S. PATENT DOCUMENTS

| | | | | |
|---|---|---|---|---|
| 2017/0142417 | A1* | 5/2017 | Deen | H04N 19/146 |
| 2018/0025753 | A1* | 1/2018 | Gewickey | H04N 13/025 |

* cited by examiner

*Primary Examiner* — Hunter B Lonsberry
(74) *Attorney, Agent, or Firm* — Michael A. Glenn; Perkins Coie LLP

(57) ABSTRACT

Client configured for retrieving a video data representation of an immersive video scene streamed by a server using a streaming protocol, wherein the server is configured for providing a plurality of streams to the client, wherein each of the streams comprises a portion of the immersive video scene, the client comprising: a sending interface; a reception interface; a viewing direction receiving unit; and a stream selecting unit; wherein the sending interface is configured for transmitting a streaming request for streaming the one or more selected streams as the video data representation of the immersive video scene, wherein the sending interface receives from the stream selecting unit a selected stream information identifying the one or more selected streams, wherein the selected stream information is created by the stream selecting unit based on the viewing direction of the user of the client and based on the manifest.

14 Claims, 11 Drawing Sheets

(51) Int. Cl.
*H04N 13/117* (2018.01)
*H04N 13/189* (2018.01)
*H04N 13/194* (2018.01)

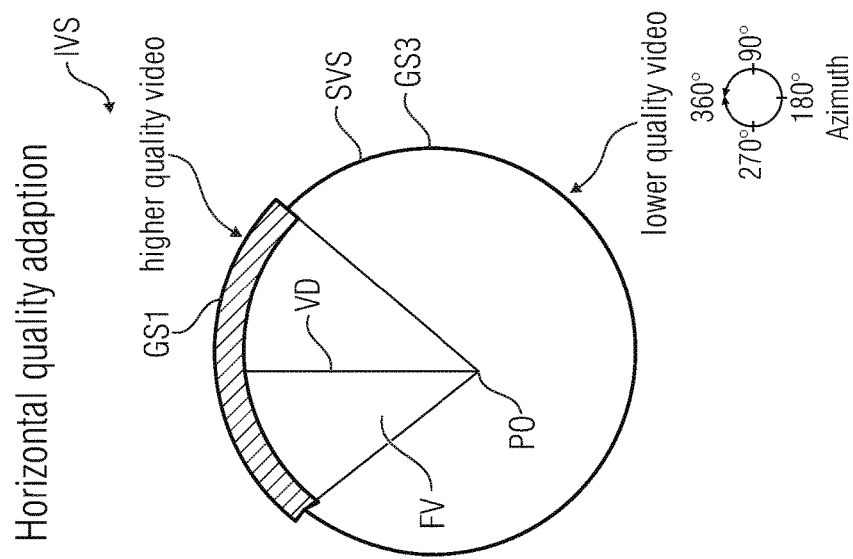
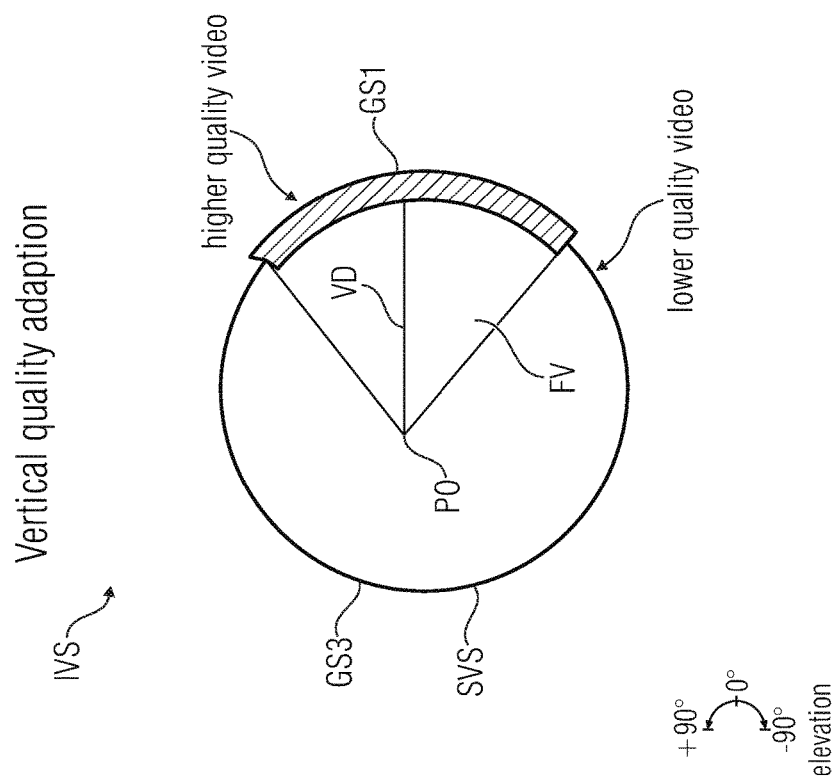

```xml
<?xml version="1.0" encoding="UTF-8" standalone="yes"?>
<MPD id="f08e80da-bf1d-4e3d-8899-f0f61556efa1" profiles="urn:mpeg:dash:profile:isoff-main:2011" type="static"
availabilityStartTime="2015-08-04T09:33:14.000Z" publishTime="2015-08-04T10:47:32.000Z"
mediaPresentationDuration="P0Y0M0DT0H3M30.000S" minBufferTime="P0Y0M0DT0H0M1.000S" bitmovin:version="1.6.0"
xmlns:ns2="http://www.w3.org/1999/xlink" xmlns="urn:mpeg:dash:schema:mpd:2011"
xmlns:bitmovin="http://www.bitmovin.net/mpd/2015">
  <Period>
    <AdaptationSet mimeType="video/mp4" codecs="avc1.42c00d" viewInformation="x=0,y=0,z=0,w=1280,h=720,id=1">
      <SegmentTemplate media="../video/view1/$RepresentationID$/dash/segment_$Number$.m4s"
initialization="../video/view1/$RepresentationID$/dash/init.mp4" duration="100000" startNumber="0" timescale="25000"/>
      <Representation id="180_250000" bandwidth="250000" width="320" height="180" frameRate="25"/>
      <Representation id="270_400000" bandwidth="400000" width="480" height="270" frameRate="25"/>
      <Representation id="360_800000" bandwidth="800000" width="640" height="360" frameRate="25"/>
      <Representation id="540_1200000" bandwidth="1200000" width="960" height="540" frameRate="25"/>
      <Representation id="720_2400000" bandwidth="2400000" width="1280" height="720" frameRate="25"/>
    </AdaptationSet>
    <AdaptationSet mimeType="video/mp4" codecs="avc1.42c00d" viewInformation="x=1280,y=0,w=1280,h=720,id=2">
      <SegmentTemplate media="../video/view2/$RepresentationID$/dash/segment_$Number$.m4s"
initialization="../video/view2/$RepresentationID$/dash/init.mp4" duration="100000" startNumber="0" timescale="25000"/>
      <Representation id="180_250000" bandwidth="250000" width="320" height="180" frameRate="25"/>
      <Representation id="270_400000" bandwidth="400000" width="480" height="270" frameRate="25"/>
      <Representation id="360_800000" bandwidth="800000" width="640" height="360" frameRate="25"/>
      <Representation id="540_1200000" bandwidth="1200000" width="960" height="540" frameRate="25"/>
      <Representation id="720_2400000" bandwidth="2400000" width="1280" height="720" frameRate="25"/>
    </AdaptationSet>
  </Period>
</MPD>
```

Fig. 12

```xml
<?xml version="1.0" encoding="UTF-8" standalone="yes"?>
<MPD id="f08e80da-b11d-4e3d-8899-f0f61556efa" profiles="urn:mpeg:dash:profile:isoff-main:2011" type="static"
availabilityStartTime="2015-08-04T09:33:14.000Z" publishTime="2015-08-04T10:47:32.000Z"
mediaPresentationDuration="P0Y0M0DT0H3M30.000S" minBufferTime="P0Y0M0DT0H0M1.000S" bitmovin:version="1.6.0"
xmlns:ns2="http://www.w3.org/1999/xlink" xmlns="urn:mpeg:dash:schema:mpd:2011"
xmlns:bitmovin="http://www.bitmovin.net/mpd/2015">
  <Period>
    <AdaptationSet mimeType="video/mp4" codecs="avc1.42c00d">
      <ViewInformationschemeId x="0" y="0" z="0" w="1280" h="720" id="0"/>
      <SegmentTemplate media="../video/view1/$RepresentationID$/dash/segment_$Number$.m4s"
initialization="../video/view1/$RepresentationID$/dash/init.mp4" duration="100000" startNumber="0" timescale="25000"/>
      <Representation id="180_250000" bandwidth="250000" width="320" height="180" frameRate="25"/>
      <Representation id="270_400000" bandwidth="400000" width="480" height="270" frameRate="25"/>
      <Representation id="360_800000" bandwidth="800000" width="640" height="360" frameRate="25"/>
      <Representation id="540_1200000" bandwidth="1200000" width="960" height="540" frameRate="25"/>
      <Representation id="720_2400000" bandwidth="2400000" width="1280" height="720" frameRate="25"/>
    </AdaptationSet>
    <AdaptationSet mimeType="video/mp4" codecs="avc1.42c00d">
      <ViewInformationschemeId x="0" y="0" z="0" w="1280" h="720" id="1"/>
      <SegmentTemplate media="../video/view2/$RepresentationID$/dash/segment_$Number$.m4s"
initialization="../video/view2/$RepresentationID$/dash/init.mp4" duration="100000" startNumber="0" timescale="25000"/>
      <Representation id="180_250000" bandwidth="250000" width="320" height="180" frameRate="25"/>
      <Representation id="270_400000" bandwidth="400000" width="480" height="270" frameRate="25"/>
      <Representation id="360_800000" bandwidth="800000" width="640" height="360" frameRate="25"/>
      <Representation id="540_1200000" bandwidth="1200000" width="960" height="540" frameRate="25"/>
      <Representation id="720_2400000" bandwidth="2400000" width="1280" height="720" frameRate="25"/>
    </AdaptationSet>
  </Period>
</MPD>
```

Fig. 13

ADAPTIVE STREAMING OF AN IMMERSIVE VIDEO SCENE

CROSS-REFERENCE TO RELATED APPLICATIONS

This application claims priority to U.S. Provisional Application No. 62/279,810 titled "Adaptive Immersive Streaming of 360° and Virtual Reality Video and Environments" and filed Jan. 17, 2016, which is incorporated by reference herein in its entirety.

DESCRIPTION

The present application is concerned with streaming of video scenes.

Media streaming technology allows people to watch a video scene via a client operating on a person's desktop, mobile phone, computer or the like.

In particular, the present application is concerned with streaming of immersive video scenes. Immersive videos scenes are video recordings where a field of view is recorded at the same time, which is larger than a field of view of a user. During playback the user may control his viewing direction so that he can immerse himself into the video scene.

Although gaming and entertainment are what come to most people's minds when discussing immersive video technology, the inevitable reach of immersive video technology extends far beyond. Completely novel scenarios, such as virtual workspaces or illustrations in context of engineering and manufacturing, are within reach in the very near future. However, all of these applications do share one big difficulty—the need to get huge amounts of data to display the video information of an entire sphere. In many cases immersive video scenarios provide a full 360° reflection of the real (or an artificial) world, which needs incomparable higher resolutions in contrast to traditional video, if the same quality level is to be maintained. If one thinks of progressive download, or traditional—non adaptive—video streaming, in this context, very high bandwidth connections will be needed to ensure low startup delay and no buffering. Otherwise the quality of experience for the end-user decreases dramatically.

To overcome this issue and ensure highest video quality, with minimal startup time and no buffering, adaptive streaming technologies like MPEG-DASH, Apple HLS, Adobe HDS, Microsoft Smooth Streaming or others are a perfect fit, and have the potential to enable seamless streaming of immersive video content. This video streaming technique allows the video player on the client device to dynamically adapt the video bitrate (quality) to the bandwidth situation of the user. Thus, the video starts faster, buffering during the streaming session is prevented, and a higher quality viewing experience is delivered.

The concept of adaptive bitrate streaming may be described as follows: The video content is available in multiple quality versions, which are also divided in segments of a given amount of time, e.g. 4 seconds. This segmentation in the time dimension as well as the quality dimension empowers the client to decide based on the current bandwidth situation, device context and other information which quality version will be downloaded at the given time. Due to this approach, the immersive video content is streamed using adaptive streaming, thus the video can adapt to the bandwidth condition of the client device.

Compared to prior art in which the immersive video content gets streamed as one single video quality containing all information and viewable areas of the spherical picture, the adaptive streaming of the content is already a big improvement.

However, the enormous bandwidth consumption of streamed immersive video content is still an issue.

Accordingly, it is an object of the present invention to provide a concept for media streaming which is more efficient in terms of, for example, transmission bandwidth consumption.

In one aspect the invention provides a client configured for retrieving a video data representation of an immersive video scene streamed by a server using a streaming protocol, wherein the server is configured for providing a plurality of streams to the client, wherein each of the streams comprises a portion of the immersive video scene, the client comprising:

a sending interface configured for sending requests concerning the immersive media scene to the server;

a reception interface configured for receiving the video data representation of the immersive media scene streamed by the server;

a viewing direction receiving unit configured for receiving a viewing direction of a user of the client, wherein the viewing direction indicates a field of view of the user; and a stream selecting unit configured for determining one or more selected streams of the plurality of streams;

wherein the sending interface is configured for transmitting to the server a transmitting request for transmitting a manifest, which contains for each of the streams of the immersive video scene a portion information, which describes properties of the portion of the spherical immersive video scene comprised in the respective stream;

wherein the reception interface is configured for receiving the manifest from the server; and wherein the sending interface is configured for transmitting a streaming request for streaming the one or more selected streams as the video data representation of the immersive video scene, wherein the sending interface receives from the stream selecting unit a selected stream information identifying the one or more selected streams, wherein the selected stream information is created by the stream selecting unit based on the viewing direction of the user of the client and based on the manifest.

The basic idea of the invention is not to deliver the whole immersive video scene at the same time in a single stream. Instead, the immersive video scene is split up into portions, wherein the portions are contained in separate streams. The client is configured in such way, that only those streams are requested from the server which are necessary to provide that portions of the immersive video scene which are in the current field of view of the user. Streams containing portions outside of the field of view of the user may be excluded from streaming so that the bitrate consumption for streaming the immersive video scene may be reduced dramatically.

In another aspect the invention provides a server for streaming a video data representation of an immersive video scene to a client, the server comprising:

a receiving interface configured for receiving requests concerning the immersive video scene from the client; and a transmitting interface having access to a plurality of streams, wherein each of the streams comprises a portion of the immersive video scene;

wherein the transmitting interface has access to a manifest, which contains for each of the streams of the immersive video scene a portion information, which describes properties of the portion of the immersive video scene comprised in the respective stream;

wherein the transmitting interface is configured for transmitting the manifest to the client in case that a transmitting request for transmitting the manifest from the client is received by the receiving interface;

wherein the receiving interface is configured for receiving from the client a streaming request for streaming one or more selected streams of the plurality of streams, wherein the one or more selected streams are determined by the client based on a viewing direction of the user of the client and based on the manifest; and wherein the transmitting interface is configured for streaming the one or more selected streams according to the transmitting request as the video data representation of the immersive video scene to the client using a streaming protocol in case that the streaming request from the client is received by the receiving interface.

The server according to the invention provides on request a manifest to the client, which contains for each of the streams of the immersive video scene a portion information, which describes properties of the portion of the immersive video scene comprised in the respective stream. Based on the portion information in the manifest the client may then determine those streams, which are needed to be streamed dependent on the current field of view of the user. The server then may provide the streams needed, whereas the other streams will not be streamed so that the bitrate consumption may be significantly reduced.

In a further aspect the invention provides a method for retrieving, by a client, a video data representation of an immersive video scene streamed by a server using a streaming protocol, wherein the server is configured for providing a plurality of streams to the client, wherein each of the streams comprises a portion of the immersive video scene, the method comprising the steps:

sending, by a sending device, requests concerning the immersive media scene to the server;

receiving, by a reception interface, the video data representation of the immersive video scene streamed by the server;

receiving, by a viewing direction receiving unit, a viewing direction of a user of the client, wherein the viewing direction indicates a field of view of the user; and determining, by a stream selecting unit, one or more selected streams of the plurality of streams;

transmitting, by the sending interface, to the server a transmitting request for transmitting a manifest, which contains for each of the streams of the immersive video scene a portion information, which describes properties of the portion of the immersive video scene comprised in the respective stream;

receiving the manifest from the server by the reception interface; and transmitting, by the sending interface, a streaming request for providing one or more selected streams as the video data representation of the immersive video scene, wherein the sending interface receives from the stream selecting unit a selected stream information identifying the one or more selected streams, wherein the selected stream information is created by the stream selecting unit based on the viewing direction of the user of the client and based on the manifest.

In another aspect the invention provides a method for streaming a video data representation of an immersive video scene from a server to a client, the method comprising the steps:

receiving, by a receiving interface of the server, requests concerning the immersive video scene from the client; and accessing, by a transmitting interface of the server, a plurality of streams, wherein each of the streams comprises a portion of the immersive video scene;

accessing, by the transmitting interface, a manifest, which contains for each of the streams of the immersive video scene a portion information, which describes properties of the portion of the immersive video scene comprised in the respective stream;

transmitting, by the transmitting interface, the manifest to the client in case that a transmitting request for transmitting the manifest from the client is received by the receiving interface;

receiving, by the receiving interface, from the client a streaming request for providing one or more selected streams of the streams, wherein the one or more selected streams are determined by the client based on a viewing direction of the user of the client and based on the manifest; and streaming, by the transmitting interface, the one or more selected streams as the representation of the immersive video scene to the client using a streaming protocol in case that the streaming request from the client is received by the receiving interface.

Preferred embodiments of the invention are subsequently discussed with respect to the accompanying drawings, in which:

FIG. 5 illustrates an example of selecting the selected streams in a side view;

FIG. 6 illustrates an example of selecting the selected streams in a top view;

FIG. 12 illustrates an example for a manifest; and

FIG. 13 illustrates a further example for a manifest.

Figure 1:
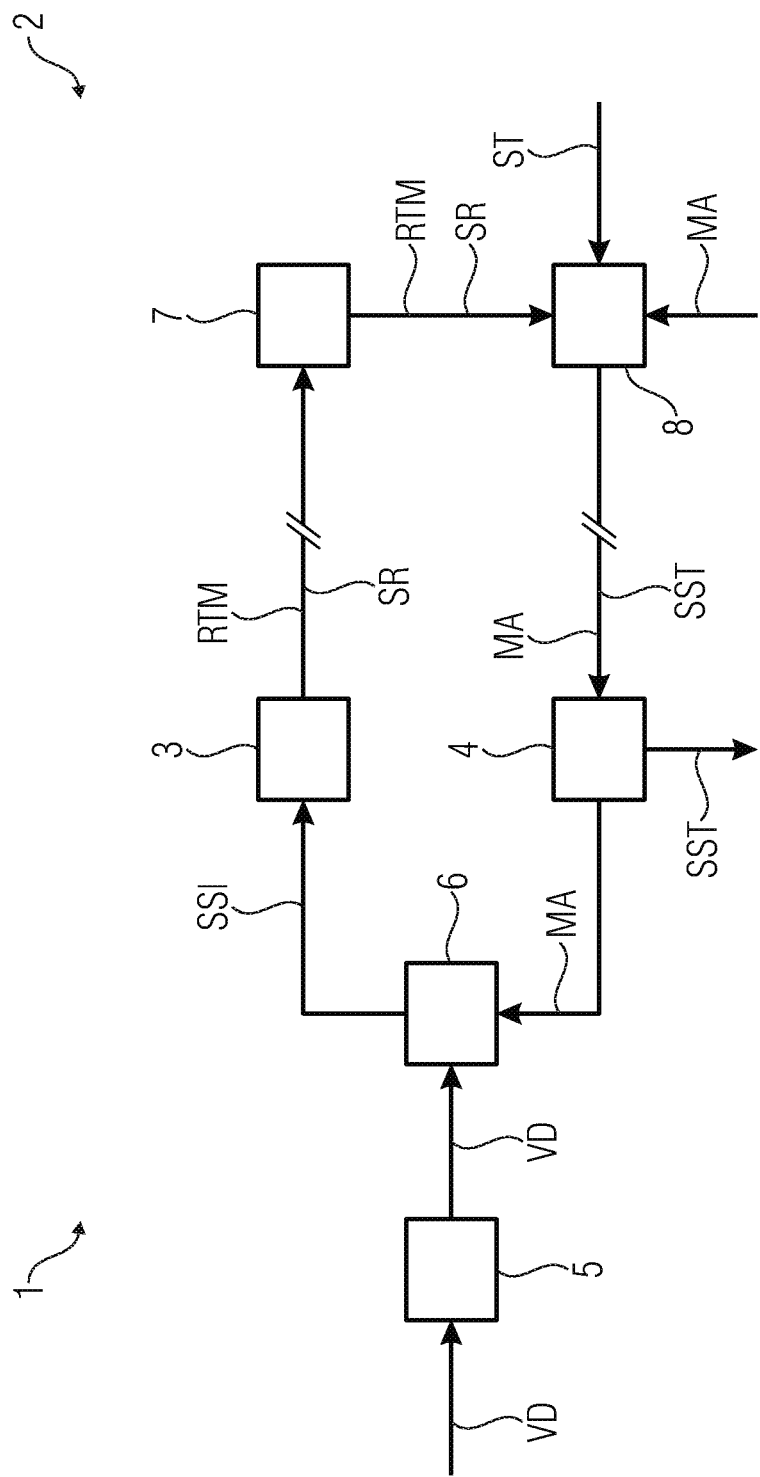
FIG. 1 illustrates an embodiment of a client and a server according to the invention in a schematic view.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 illustrates an embodiment of a client 1 and a server 2 according to the invention in a schematic view.

The client 1 is configured for retrieving a video data representation of an immersive video scene IVS (see FIG. 2) streamed by a server 2 using a streaming protocol, wherein the server 2 is configured for providing a plurality of streams ST to the client 1, wherein each of the streams ST comprises a portion TI (see FIG. 2) of the immersive video scene IVS, the client 2 comprising:

a sending interface 3 configured for sending requests RTM, SR concerning the immersive media scene IVS to the server 2;

a reception interface 4 configured for receiving the video data representation of the immersive media scene IVS streamed by the server 2;

a viewing direction receiving unit 5 configured for receiving a viewing direction VD (see FIG. 2) of a user of the client 2, wherein the viewing direction VD indicates a field of view FV (see FIG. 2) of the user; and a stream selecting unit 6 configured for determining one or more selected streams SST of the plurality of streams ST;

wherein the sending interface 3 is configured for transmitting to the server 2 a transmitting request RTM for transmitting a manifest MA, which contains for each of the streams ST of the immersive video scene IVS a portion information PI (see FIG. 11), which describes properties of the portion of the immersive video scene IVS comprised in the respective stream ST;

wherein the reception interface 4 is configured for receiving the manifest MA from the server 2; and wherein the sending interface 3 is configured for transmitting a streaming request SR for streaming the one or more selected streams SST as the video data representation of the immersive video scene IVS, wherein the sending interface 3 receives from the stream selecting unit 6 a selected stream information SSI identifying the one or more selected streams SST, wherein the selected stream information SSI is created by the stream selecting unit 6 based on the viewing direction VD of the user of the client and based on the manifest MA.

The server 2 is configured for streaming a video data representation of an immersive video scene IVS to a client 1, the server 2 comprising:

a receiving interface 7 configured for receiving requests RTM, SR concerning the immersive video scene IVS from the client 1; and a transmitting interface 8 having access to a plurality of streams ST, wherein each of the streams ST comprises a portion TI of the immersive video scene IVS;

wherein the transmitting interface 8 has access to a manifest MA, which contains for each of the streams ST of the immersive video scene IVS a portion information PI, which describes properties of the portion TI of the immersive video scene IVS comprised in the respective stream ST;

wherein the transmitting interface 8 is configured for transmitting the manifest MA to the client one in case that a transmitting request RTM for transmitting the manifest MA from the client one is received by the receiving interface 7;

wherein the receiving interface 7 is configured for receiving from the client 1 a streaming request SR for streaming one or more selected streams SST of the plurality of streams ST, wherein the one or more selected streams SST are determined by the client 1 based on a viewing direction VD of the user of the client one and based on the manifest MA; and wherein the transmitting interface 8 is configured for streaming the one or more selected streams SST according to the transmitting request RTM as the video data representation of the immersive video scene IVS to the client 1 using a streaming protocol in case that the streaming request SR from the client 1 is received by the receiving interface 7.

The immersive video scene IVS may comprise a fully spherical immersive scene. A fully spherical immersive scene allows the user to rotate his viewing direction VD horizontally in an azimuth range of from 0° to 360° and vertically in an elevation range from −90° to +90°. However, the immersive video scene IVS may be limited to a part of a fully spherical immersive scene. Such a partial spherical immersive scene allows the user to rotate his viewing direction VD to a lower extent than a fully spherical immersive scene.

For producing the immersive video scene IVS, a panorama camera or a collection of cameras may be used, so that the immersive video scene IVS is a representation of a real world scene. However, the immersive video scene IVS may also be produced using computer technologies that use software to generate the immersive video scene IVS which replicates a real environment or create an imaginary setting. Such artificially created immersive video scenes IVS are often referred to as virtual reality video scenes. Moreover, the immersive video scene IVS may be a combination of real world elements and virtual reality elements, which is often referred to as augmented reality video scene.

As streaming protocol dynamic adaptive streaming over HTTP may be used. Dynamic adaptive streaming over HTTP (DASH) is an adaptive bitrate streaming technique for high quality streaming of multimedia content including immersive video content over the internet. Dynamic adaptive streaming over HTTP streaming typically partitions media content into a sequence of small temporal segments with each such temporal segment containing a portion of the media content in a short interval of playback time. Typically, the content is made available with a media presentation description (MPD) file or manifest MA which describes information concerning the temporal segments such as timing, URL, media characteristics such as video resolution and bitrates and so forth.

The client is configured for processing the selected streams simultaneously and for combining at least some of the selected streams in order to produce a total view of the immersive video scene which then may be displayed on a display.

The server is configured for providing the selected streams simultaneously.

In another aspect the invention provides a system for streaming a video data representation of an immersive video scene IVS from a server 2 to a client 1, wherein the server 2 is configured according to the invention, and wherein the client 1 is configured according to the invention.

In a further aspect the invention provides a method for retrieving, by a client 1, a video data representation of an immersive video scene IVS streamed by a server 2 using a streaming protocol, wherein the server 2 is configured for providing a plurality of streams ST to the client 1, wherein each of the streams ST comprises a portion TI of the immersive video scene IVS, the method comprising the steps:

sending, by a sending device 3, requests RTM, SR concerning the immersive media scene IVS to the server 2;

receiving, by a reception interface 4, the video data representation of the immersive video scene IVS streamed by the server;

receiving, by a viewing direction receiving unit 5, a viewing direction VD of a user of the client 1, wherein the viewing direction VD indicates a field of view FW of the user; and determining, by a stream selecting unit 6, one or more selected streams SST of the plurality of streams ST;

transmitting, by the sending interface 3, to the server 2 a transmitting request RTM for transmitting a manifest MA, which contains for each of the streams ST of the immersive video scene IVS a portion information PI, which describes properties of the portion TI of the immersive video scene IVS comprised in the respective stream ST;

receiving the manifest MA from the server to by the reception interface 4; and transmitting, by the sending interface 3, a streaming request SR for providing the one or more selected streams SST as the video data representation of the immersive video scene IVS, wherein the sending interface 3 receives from the stream selecting unit 6 a selected stream information SSI identifying the one or more selected streams SST, wherein the selected stream information SSI is created by the stream selecting unit 6 based on the viewing direction VD of the user of the client 1 and based on the manifest MA.

In another aspect the invention provides a computer program for, when running on a processor, executing the method for retrieving, by a client 1, a video data representation of an immersive video scene IVS streamed by a server 2 using a streaming protocol.

In another aspect the invention provides a method for streaming a video data representation of an immersive video scene IVS from a server 2 to a client 1, the method comprising the steps:

receiving, by a receiving interface 7 of the server 2, requests RTM, SR concerning the immersive video scene IVS from the client 1; and accessing, by a transmitting interface 8 of the server, a plurality of streams ST, wherein each of the streams ST comprises a portion TI of the immersive video scene IVS;

accessing, by the transmitting interface 8, a manifest MA, which contains for each of the streams ST of the immersive video scene IVS a portion information PI, which describes properties of the portion TI of the immersive video scene IVS comprised in the respective stream ST;

transmitting, by the transmitting interface, the manifest MA to the client 1 in case that a transmitting request RTM for transmitting the manifest MA from the client 1 is received by the receiving interface;

receiving, by the receiving interface 7, from the client 1 a streaming request SR for providing one or more selected streams SST of the streams ST, wherein the one or more selected streams SST are determined by the client 1 based on a viewing direction VD of the user of the client 1 and based on the manifest MA; and streaming, by the transmitting interface 8, the one or more selected streams SST as the representation of the immersive video scene IVS to the client 1 using a streaming protocol in case that the streaming request SR from the client is received by the receiving interface 7

In another aspect the invention provides a computer program for, when running on a processor, executing the method for streaming a video data representation of an immersive video scene IVS from a server 2 to a client 1.

Figure 2:
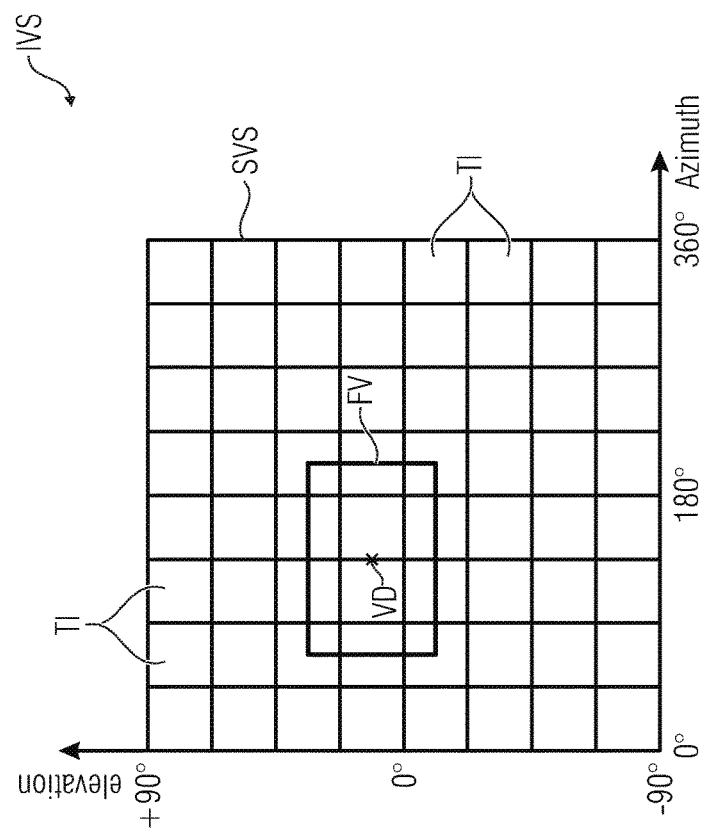
FIG. 2 illustrates a structure of a spherical video scene of an immersive video scene.

FIG. 2 illustrates a structure of a spherical video scene SVS of an immersive video scene IVS in a two-dimensional representation. As an example, the immersive video scene IVS comprises one spherical video scene SVS. The spherical video scene SVS is a fully spherical video scene, which allows the user to rotate his viewing direction VD horizontally in an azimuth range of from 0° to 360° and vertically in an elevation range from −90° to +90°. The spherical video scene SVS corresponds to a position of the user (see FIG. 3), which is usually the center point of a sphere to which the content is projected to. The spherical video scene SVS is split up into a plurality of tiles TI, wherein each of the tiles TI represents a regional portion of the spherical video scene SVS. Each of the tiles TI may be streamed in one stream ST of the plurality of streams ST. In the example of FIG. 2 the tiles TI of the plurality of tiles TI are separated horizontally and vertically.

Figure 3:
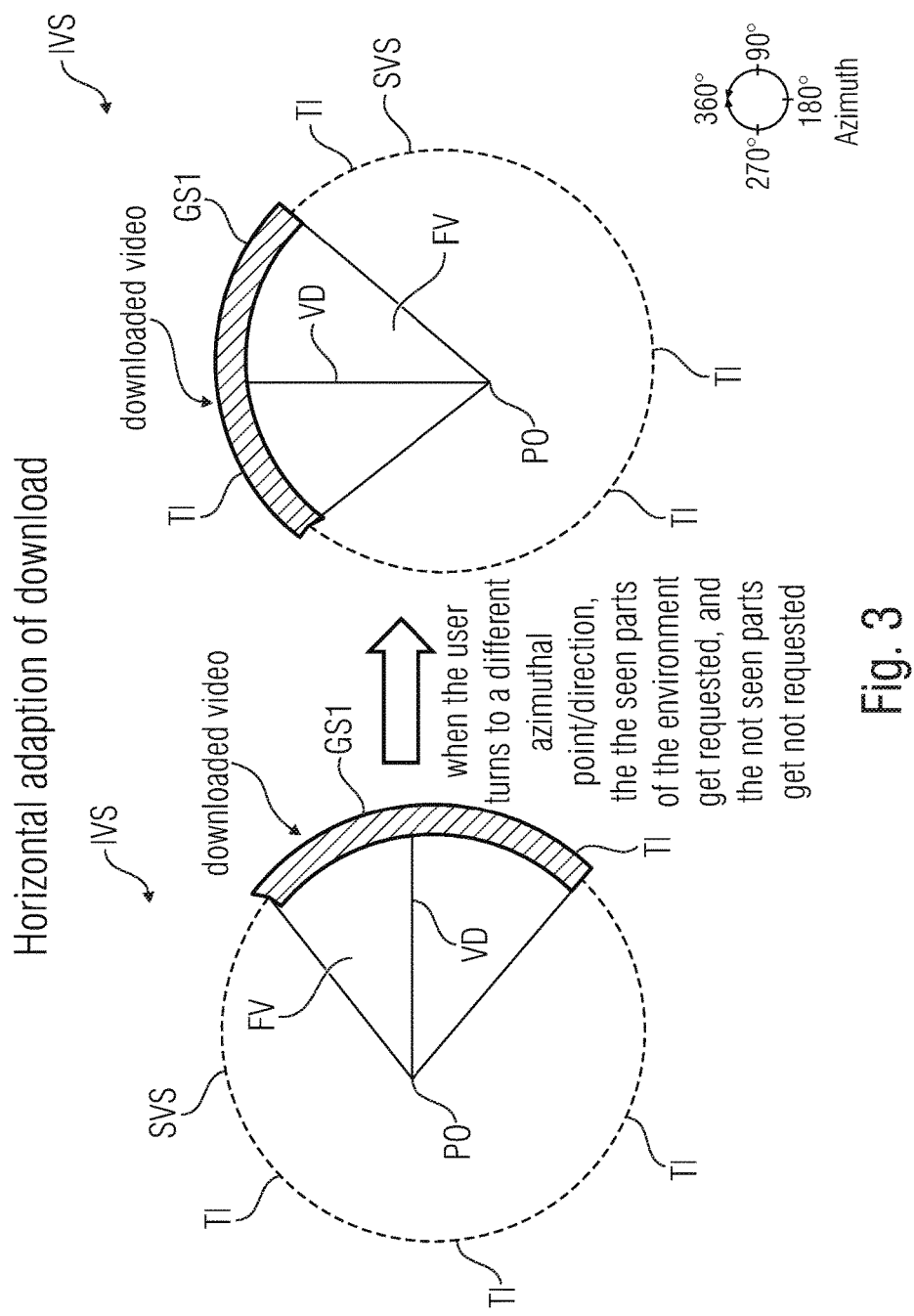
FIG. 3 illustrates an example for a horizontal adaption of the selection of the selected streams in a top view in case that the user rotates his viewing direction horizontally.

FIG. 3 illustrates an example for a horizontal adaption of the selection of the selected streams SST in a top view in case that the user rotates his viewing direction horizontally.

In some embodiments of the client 2 the immersive video scene IVS comprises at least one spherical video scene SVS corresponding to a position PO of the user of the client 1, wherein the spherical video scene SVS is split up into a plurality of tiles TI, wherein each of the tiles TI represents a regional portion of the spherical video scene SVS, wherein each of the tiles TI is contained in one stream ST of the plurality of streams ST, wherein for each of the streams ST comprising one of the tiles TI, the properties described in the portion information PI (see FIG. 11) comprise a regional description RD (see FIG. 11) of the regional portion represented by the respective tile TI, wherein at least some tiles TI of the plurality of tiles TI are separated horizontally and/or vertically, wherein the stream selecting unit 6 is configured for including into the one or more selected streams SST a first group GS1 of streams ST of the plurality of streams ST, which comprise the one or more streams ST containing one of the tiles TI, which are at least partially inside of the field of view FV of the user, and for not including into the one or more selected streams SST a second group of the streams, which comprise at least some of the one or more streams ST containing one of the tiles TI, which are outside of the field of view FV of the user.

In some embodiments the spherical video scene SVS is split up horizontally. For this, the spherical video scene SVS is split up into horizontally separated tiles TI on the side of the server 2, wherein each tile TI is representing an azimuth range of the spherical video scene SVS. When the user looks in a given azimuthal viewing direction VD the selected streams SST are selected, requested and downloaded, when the user looks in a different azimuthal viewing direction VD—e.g. by turning his head (using a virtual reality headset), by moving the mobile device (e.g. smartphone) or by moving the mouse in a web browser environment, etc.— different selected streams SST are determined, requested and downloaded.

Figure 4:
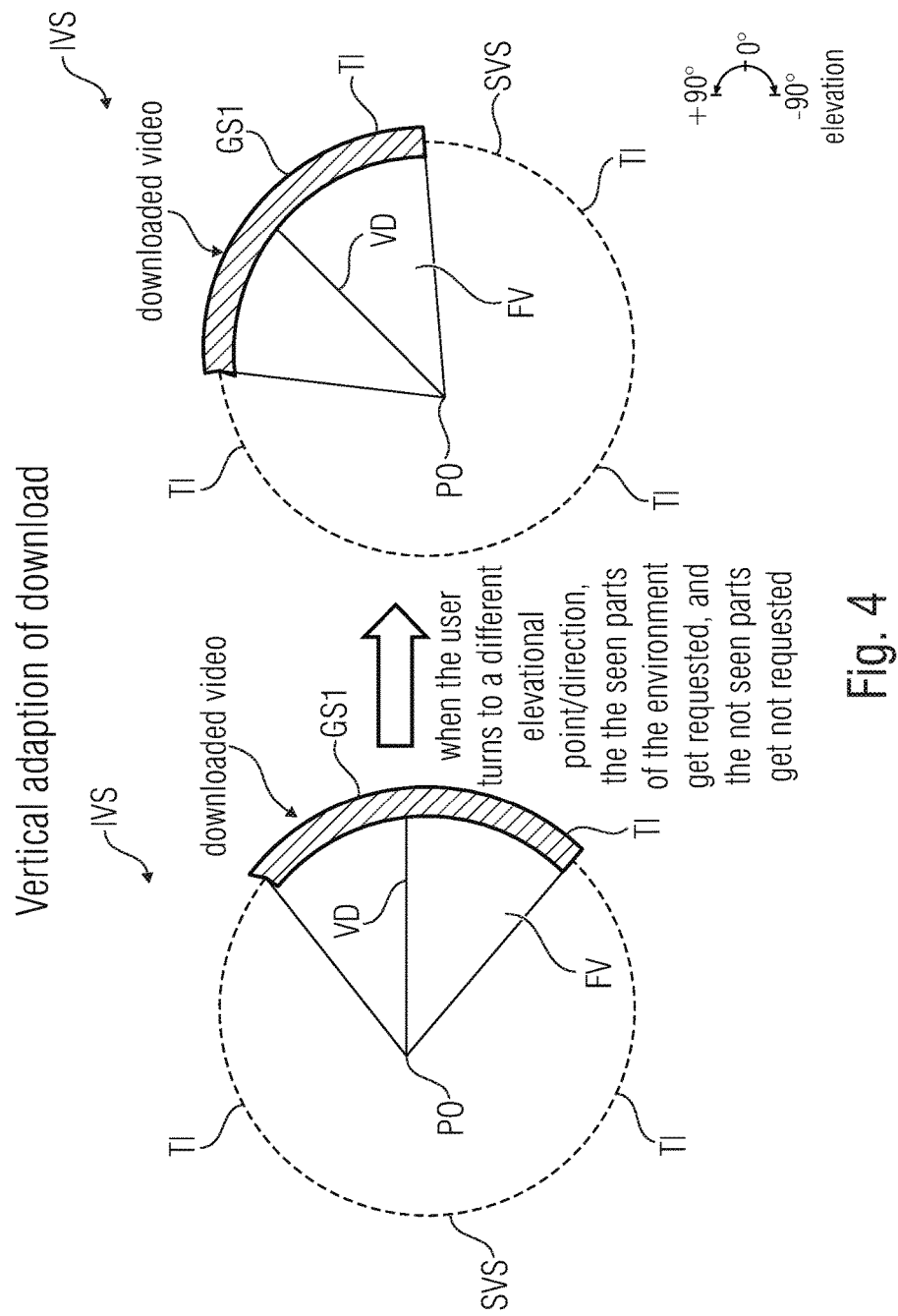
FIG. 4 illustrates an example for a vertical adaption of the selection of the selected streams in a side view in case that the user rotates his viewing direction vertically.

E.g. if the user turns left, the missing parts of the spherical video scene SVS on the left side of the currently seen spherical video scene SVS, which are now seen by the user, are downloaded and the previously downloaded parts of the spherical video scene SVS on the right side, which are not seen anymore, are not downloaded any more FIG. 4 illustrates an example for a vertical adaption of the selection of the streams SST in a side view in case that the user rotates his viewing direction vertically.

In some embodiments the spherical video scene SVS is split up vertically. For this, the spherical video scene SVS is split up into vertically separated tiles TI on the side of the server 2. As shown in FIG. 2, the spherical video scene SVS may be split up into vertically and horizontally separated tiles TI. The respective streams are provided separately, and the client can download the streams which fit to the current viewing direction of the user.

When the user looks in a given elevational viewing direction VD the selected streams SST are selected, requested and downloaded, when the user looks in a different elevational viewing direction VD—e.g. by turning his head (using a virtual reality headset), by moving the mobile device (e.g. smartphone) or by moving the mouse in a web browser environment, etc.—different selected streams SST are selected, requested and downloaded.

E.g. if the user turns more upwards, the missing parts of the spherical video scene SVS on the upper side of the currently seen spherical video scene SVS, which are now seen by the user, are downloaded and the previously downloaded parts of the spherical video scene SVS the lower side, which are not seen anymore, are not downloaded any more.

As a result the client 1 decides which combination of portions of the whole immersive video scene IVS will be downloaded based on the given viewing direction VD of the user.

FIG. 5 illustrates an example of selecting the selected streams SST in a side view, wherein the quality is adapted in accordance with an elevation angle of the viewing direction VD.

In some embodiments the server 2 is configured for providing at least one of the plurality of streams ST at different qualities, wherein for each of the streams ST the properties described in the portion information PI comprise a quality description QD (see FIG. 11) of the different qualities being available, wherein the stream selecting unit 6 is configured for determining the quality for the at least one stream ST being available at different qualities based on the viewing direction VD of the user of the client 1 and based on the manifest MA.

The parts of the immersive video scene IVS that are not seen by the user at a given moment may be downloaded in a lower quality, which is possible using the adaptive streaming approach (as also for the previous methods). By doing so, the user can turn to any part of the immersive video scene IVS and immediately see this parts. However, the bitrate consumption may be significantly reduced.

In some embodiments the immersive video scene IVS comprises at least one spherical video scene SVS corresponding to a position PO of the user of the client 1, wherein the spherical video scene SVS is split up into a plurality of tiles TI, wherein each of the tiles TI represents a regional portion of the spherical video scene SVS, wherein each of the tiles TI is contained in one stream ST of the plurality of streams ST, wherein for each of the streams ST comprising one of the tiles TI, the properties described in the portion information PI comprise a regional description RD of the regional portion represented by the respective tile TI, wherein at least some tiles TI of the plurality of tiles TI are separated horizontally and/or vertically, wherein the stream selecting unit 6 is configured for including into the one or more selected streams SST a first group GS1 of streams ST of the plurality of streams ST, which comprise the one or more streams ST containing one of the tiles TI, which are at least partially inside of the field of view FV of the user, and a third group GS3 of the streams ST, which comprise at least some of the one or more streams ST containing one of the tiles TI, which are outside of the field of view FV of the user, wherein the stream selecting unit 6 is configured for determining the quality for the first group GS1 of streams ST and the quality for the third group GS3 of streams ST in such way that the quality of the first group GS1 of streams ST is higher than the quality of the third group GS3 of streams ST.

FIG. 6 illustrates an example of selecting the selected streams SST in a top view, wherein the quality is adapted in accordance with an azimuth of the viewing direction VD.

In the examples of FIGS. 5 and 6 the parts of the immersive video scene IVS that are not seen by the user at a given moment may be downloaded in a lower quality, which is possible using the adaptive streaming approach (as also for the previous methods). By doing so, the user can turn to any portion of the immersive video scene IVS and immediately see this portion. However, the bitrate consumption may be significantly reduced.

Figure 7:
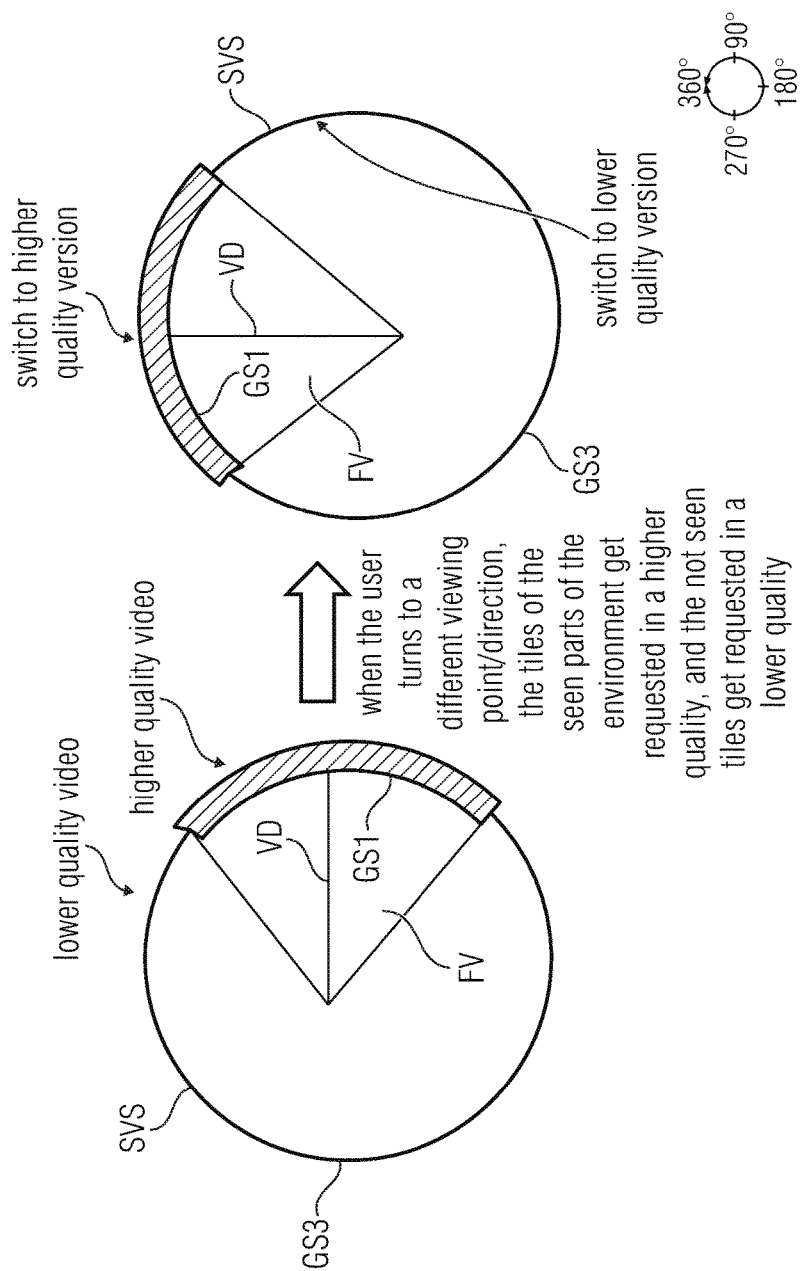
FIG. 7 illustrates a further example for a horizontal adaption of the selection of the selected streams in a top view in case that the user rotates his viewing direction horizontally.

FIG. 7 illustrates a further example for a horizontal adaption of the selection of the selected streams SST in a top view in case that the user rotates his viewing direction VD horizontally.

When the user turns to a different portion of the immersive video scene IVS, the different portion is in a lower quality than the previous portion. The client 1 recognizes the different field of view FV, reduces the quality of the portions, which are not seen by the user, and increases the quality of the portions, which are seen by the user.

A vertical adaption of the selection of the selected streams SST may be done similarly.

Figures 8, 9:
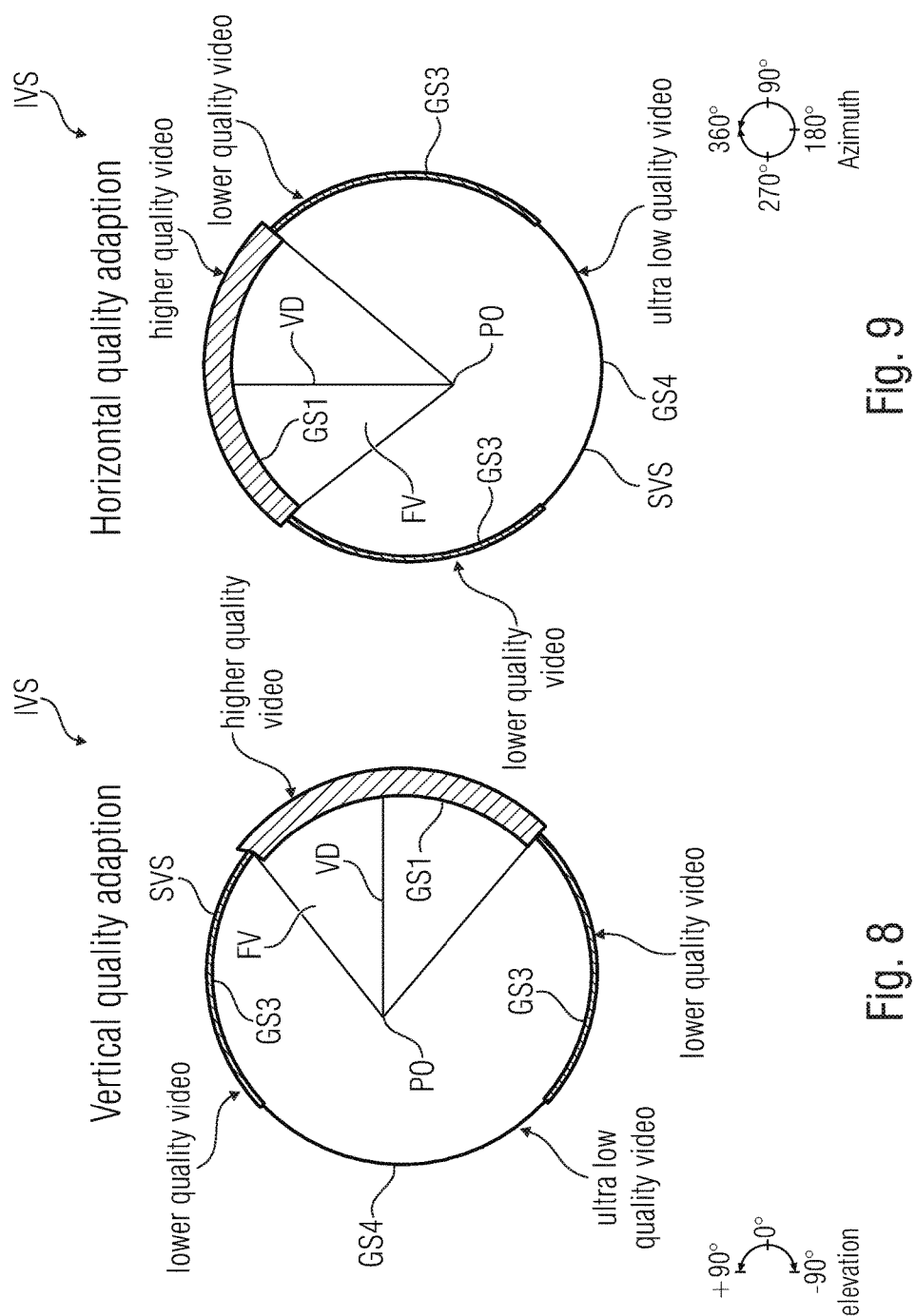
FIG. 8 illustrates an example of selecting the selected streams in a side view.
FIG. 9 illustrates an example of selecting the selected streams in a top view.

FIG. 8 illustrates an example of selecting the selected streams SST in a side view, which is based on the embodiment of FIG. 5, wherein the quality is adapted in accordance with an elevation angle of the viewing direction VD.

FIG. 9 illustrates an example of selecting the selected streams SST in a top view, which is based on the example of FIG. 6, wherein the quality is adapted in accordance with an azimuth of the viewing direction VD.

In embodiments of FIGS. 8 and 9, the stream selecting unit 6 is configured for including into the one or more selected streams SST a fourth group GS4 of streams ST of the plurality of streams ST, which comprise at least some of the one or more streams ST containing one of the tiles TI, which are outside of the field of view FV of the user and farer away from the field of view FV than the tiles of the third group GS3 of the streams ST, and wherein the stream selecting unit 6 is configured for determining the quality for the third group GS3 of streams ST and the quality for the fourth group GS4 of streams ST in such way that the quality of the fourth group GS4 of streams ST is lower than the quality of the third group GS3 of streams ST.

According to this approach, the portions near to the currently seen portions of the spherical video scene SVS may be downloaded in a lower quality, wherein the portions in the back of the user may be downloaded in the lowest quality.

Figure 10:
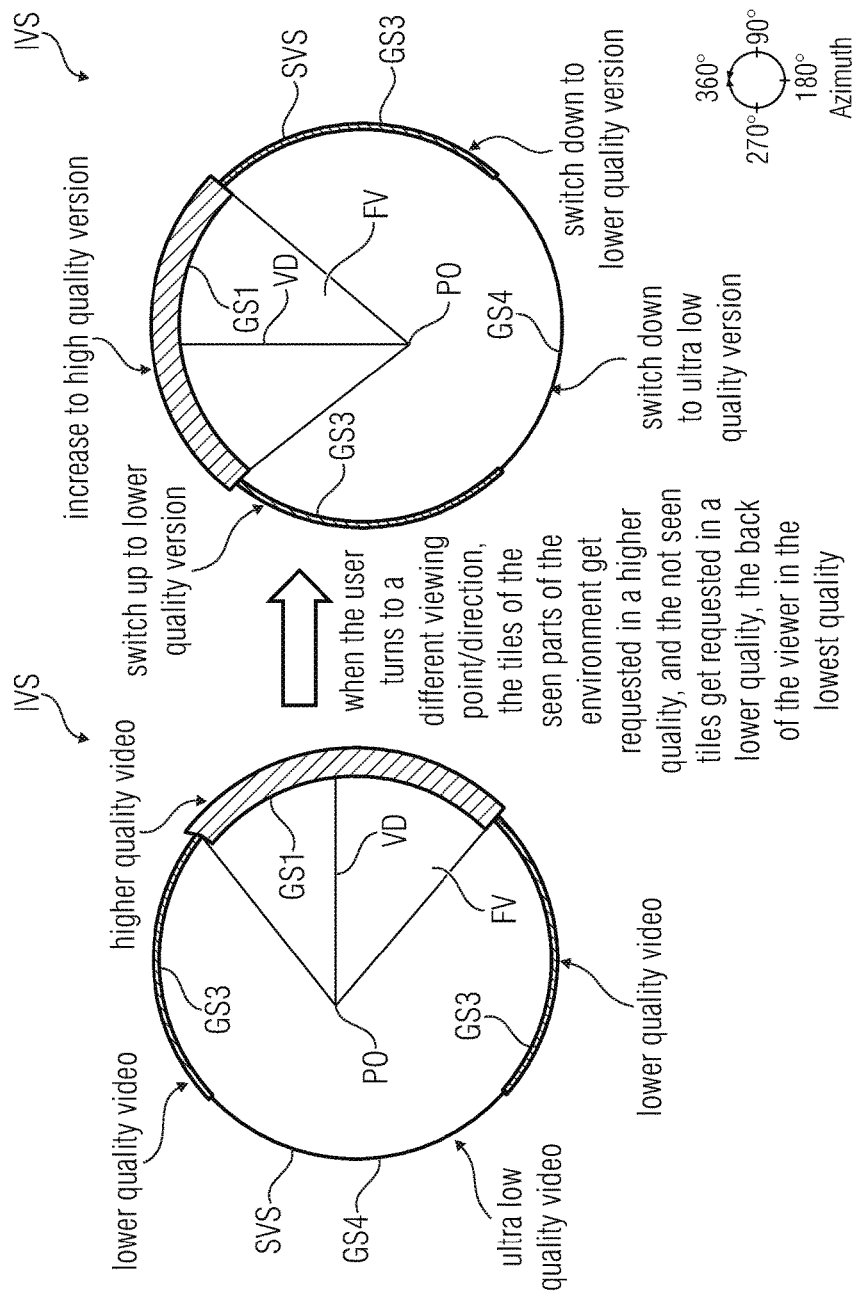
FIG. 10 illustrates a further example for a horizontal adaption of the selection of the selected streams in case that the user rotates his viewing direction horizontally.

FIG. 10 illustrates a further example for a horizontal adaption of the selection of the selected streams in case that the user rotates his viewing direction horizontally.

When the user turns to a different portion of the spherical video scene SVS in this environment slightly or slowly, he/she sees a lower quality version of the content instead of a ultralow quality version. As soon as the user turns the head, the client 1 increases the seen portions of the spherical video scene SVS to a better quality, chooses the lower quality of the areas next to the seen portion of the spherical video scene SVS, and choses the ultralow quality for the portions of the spherical video scene SVS in the back of the user.

A vertical adaption of the selection of the selected streams SST may be done similarly.

Figure 11:
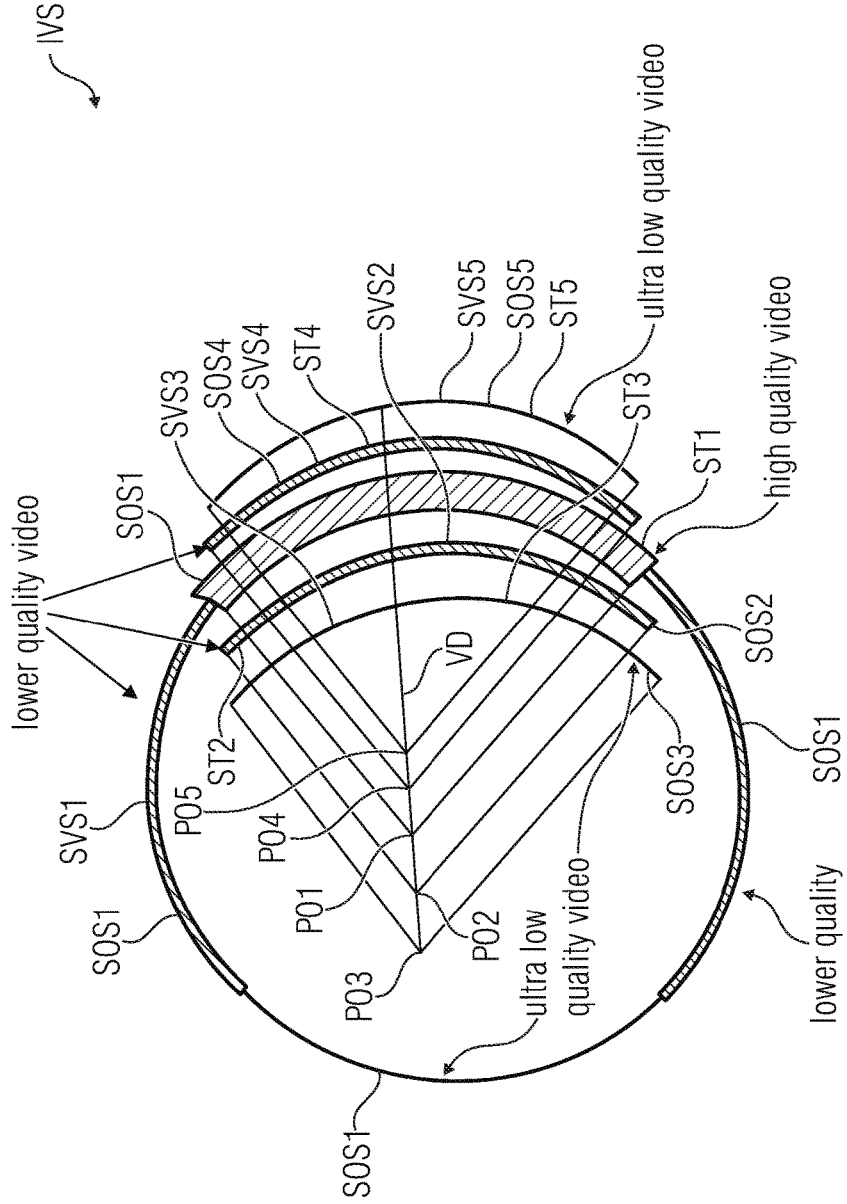
FIG. 11 illustrates a further example of selecting the selected streams in a top view for the case that depth information is available.

FIG. 11 illustrates a further example of selecting the selected streams for the case that depth information is available.

In some embodiments the immersive video scene IVS comprises a plurality of spherical video scenes, wherein the spherical video scenes SVS1, . . . , SVS5 of the plurality of spherical video scenes SVS1, . . . , SVS5 correspond to positions PO1, . . . , PO5 of the user of the client 1 in the immersive video scene IVS, wherein each of the plurality of spherical video scenes SVS1, . . . , SVS5 consists of a set SOS1, . . . , SOS5 of streams ST of the plurality of the streams ST, wherein for each of the streams ST the properties described in the portion information PI comprise a description to which spherical video scene SVS1, . . . , SVS5 of the spherical video scenes SVS1, . . . , SVS5 the respective stream ST belongs, wherein the stream selecting unit 6 is configured for including into the one or more selected streams SST at least one stream ST1 from a first set SOS1 of the sets SOS1, . . . , SOS5 of streams ST, which corresponds to an actual first position PO1 of the positions PO1, . . . , PO5, and at least one stream ST2 from a second set SOS2 of the sets SOS1, . . . , SOS5 of streams ST, which corresponds to a second position PO2 of the positions PO1, . . . , PO5, which is adjacent to the first position PO1, wherein the at least one stream ST2 from the second set SOS2 of streams ST corresponds to the at least one stream ST1 from the first set SOS1 of streams ST, and wherein the stream selecting unit 6 is configured for determining the quality for the first set SOS1 of streams ST and the quality for the second set SOS2 of streams ST in such way that the at least one stream ST1 of the first set SOS1 of streams ST has a higher quality than at least one stream ST2 of the second set SOS2 of streams ST.

Streams ST from different sets SOS of streams ST correspond, if they contain corresponding portions of the immersive video scene IVS scene from different perspectives.

In some embodiments the stream selecting unit 6 is configured for including into the one or more selected streams SST at least one stream ST3 of a third set SOS3 of the sets SOS1, . . . , SOS5 of streams ST, which corresponds to a third position PO3 of the positions PO1, . . . , PO5, wherein the third position PO3 is at the same side of the first position PO1 as the second position PO2 and farer away from the first position PO1 than the second position PO2 is away from the first position PO1, wherein the at least one stream ST3 from the third set SOS3 of streams ST corresponds to the at least one stream ST1 from the first set SOS1 of streams ST, and wherein the stream selecting unit 6 is configured for determining the quality for the second set SOS2 of streams ST and the quality for the third set SOS3 of streams ST in such way that the at least one stream ST3 of the third set SOS3 of streams ST has a lower quality than the at least one stream ST2 of the second set SOS2 of streams ST.

In some embodiments the stream selecting unit 6 is configured for including into the one or more selected streams SST at least one stream ST4 of a fourth set SOS4 of the sets SOS1, . . . , SOS5 of streams, which corresponds to a fourth position PO4 of the positions PO1, . . . , PO5, which is adjacent to the first position PO1 and opposite of the second position PO2, wherein the at least one stream ST4 from the fourth set SOS4 of streams ST corresponds to the at least one stream ST1 from the first set SOS1 of streams ST, and wherein the stream selecting unit 6 is configured for determining the quality for the first set SOS1 of streams ST and the quality for the fourth set SOS4 of streams ST in such way that the at least one stream ST1 of the first set SOS1 of streams ST has a higher quality than at least one stream ST4 of the fourth set SOS4 of streams ST.

In some embodiments the stream selecting unit 6 is configured for including into the one or more selected streams SST at least one stream ST5 of a fifth set SOS5 of the sets SOS1, . . . , SOS5 of streams ST, which corresponds to a fifth position PO5 of the positions PO1, . . . , PO5, wherein the fifth position is at the same side of the first position as the fourth position and farer away from the first position than the fourth position is away from the first position, wherein the at least one stream ST5 from the fifth set SOS5 of streams ST corresponds to the at least one stream ST1 from the first set SOS1 of streams ST, and wherein the stream selecting unit 6 is configured for determining the quality for the fourth set SOS4 of streams ST and the quality for the fifth set SOS5 of streams ST in such way that the at least one stream ST5 of the fifth set SOS5 of streams ST has a lower quality than the at least one stream ST4 of the fourth set SOS4 of streams ST.

If the immersive video scene IVS also includes depth information where the user can go forward or backward in the immersive video scene IVS, the previously mentioned techniques may be extended by additional streams ST of the immersive video scene IVS representing the different depth perspectives available. This can be applied similar to the previously mentioned techniques, also in the different qualities.

To give an example of this, FIG. 11 shows the downloading of additional depth streams ST of the immersive video scene IVS, e.g. when the user moves forward or backward. Again the user sees in this case a lower or ultralow quality, depending how fast he/she moves forward or backward, and the client 1 starts to adjust the quality based on the new position of the user in the immersive video scene IVS.

As a further improvement of this setup, the streams ST for the portions in the front and the back of the user in low-quality or in ultralow quality, can be extended by additional streams ST for the left, right, above and below area of the current field of view FV. These additional streams ST can have a lower quality if desired. Again, if the user moves in this case in the immersive video scene IVS, the quality of the different parts of the virtual reality space are adjusted to the new viewing direction.

FIG. 12 illustrates an example for a manifest MA.

In some embodiments the manifest MA is a media presentation description for dynamic adaptive streaming over HTTP, wherein for each of the streams ST the portion information PI is integrated in the media presentation in an XML tag.

Dynamic adaptive streaming over HTTP allows providing different representations having different qualities for the streams ST of the media content. The qualities may differ in bitrate, resolution or other factors. A selection of the quality to be downloaded can be made, typically automatically, based on the manifest MA and with viewing direction VD over user. Thus, dynamic adaptive streaming over a HTTP is beneficial for the invention.

Adaptive streaming technologies, like MPEG-DASH, Apple HLS, Microsoft Smooth Streaming or Adobe HDS, describe the content using a manifest file MA. These manifest files MA described in the different streams ST can be extended to present the variety of different streams representing the different portions of the immersive video scene IVS. This can be done by adding the portion information PI, which describes properties of the portion of the spherical immersive video scene IVS comprised in the respective stream ST to the manifest MA, so that the client 1 can identify which stream ST is belonging to which portion of the immersive video scene.

The example MPEG-DASH manifest MA integrates regional description RD as part of an XML tag, e.g. the Period, AdaptionSet, or Representation. In the example of FIG. 12 the manifest MA comprises two portion informations PI1 and PI2 which comprise regional descriptions RD1 and RD2 respectively. Furthermore, the manifest MA comprises quality descriptions QD1 and QD2 contained in the portion informations PI1 and P12.

The regional descriptions RD1 and RD2 of the portion informations PI1 and PI2 are respective bit stored in the viewInformation attribute in the AdaptationSet element. The regional descriptions RD1 and RD2 could also be stored in the individual representations or in a separate file and just linked in the manifest MA. Moreover the viewInformation could contain additional information that is needed by the client 1 or any metadata.

FIG. 13 illustrates a further example for a manifest MA. In the further example the MPEG-DASH manifest MA integrate the regional descriptions RD1 and RD2 as additional XML tag within, e.g., the Period, AdaptionSet, or Representation. As one can see, there are many possibilities to provide the additional regional descriptions RD1 and RD2 in the manifest file MA of an adaptive streaming format.

In some embodiments (not explicitly shown in the Figs.) the immersive video scene IVS comprises at least one spherical video scene SVS corresponding to a position PO of the user of the client 1, wherein the spherical video scene SVS is split up into a foreground and a background, wherein the foreground is contained in a fifth group of streams ST of the plurality of streams ST and the background is contained in a sixth group of streams ST of the plurality of streams ST, wherein for each of the streams ST, the properties described in the portion information PI comprise a description whether the respective stream ST belongs to the foreground or to the background, wherein the stream selecting unit 6 is configured for including into the one or more selected streams SST those streams ST of the fifth group of streams ST, which are at least partially inside of the field of view FV of the user, are included in the one or more selected streams SST, and wherein the stream selecting unit 6 is configured for not including into the one or more selected streams SST those streams ST of the fifth group of streams ST, which are outside of the field of view FV of the user.

The immersive video scene IVS does not need to be split into regular tiles TI. In case of coding efficiency it can make sense to create completely different regions, e.g., the background in the image (blue sky) could be one full tile and the other parts could be separated as shown. Elements of the foreground which are completely outside of the field of few FV may then be excluded from streaming. However, elements in the foreground that that are partially in the field of view FV of the user may be downloaded in higher quality as they are partially in the in the field of view FV (sky) with this approach.

In some embodiments the immersive video scene IVS comprises at least one spherical video scene SVS corresponding to a position PO of the user of the client 1, wherein the spherical video scene SVS is split up into a foreground and a background, wherein the foreground is contained in a fifth group of streams ST of the plurality of streams ST and the background is contained in a sixth group of streams of the plurality of streams ST, wherein for each of the streams ST, the properties described in the portion information PI comprise a description whether the respective stream ST belongs to the foreground or to the background, wherein the stream selecting unit 6 is configured for including into the one or more selected streams SST at least one stream ST of the fifth group of streams ST and at least one stream ST of the sixth group of streams ST, and wherein the stream selecting unit 6 is configured for determining the quality for the fifth group of streams ST and the quality for sixth group of streams ST in such way at least one stream ST of the sixth group of streams ST has a lower quality than at least one stream of the fifth group of streams ST.

This streaming approach could be further optimized by not downloading everything in high quality that is in the field of view FD of the user. The adaptation could be more fine granular for example elements in the foreground could be downloaded in higher quality and the background could be downloaded in lower quality, this further increases streaming performance (like object based coding).

Having depth information available could be used to identify objects or object areas and transferring this objects as separate stream. This could be done according to reference [1]. This means not splitting the video into regular shaped tiles TI, e. g. rectangles, rather splitting it into objects. If the user wants to go forward or backward, the o him him bject could be adapted accordingly. In case of artificial environments one would have exact information about objects and this approach could be further optimized.

Thus, in some embodiments at least one stream of the fifth group of streams may consist of a parametrically coded object.

In some embodiments the immersive video scene IVS is structured into periods, wherein the sending interface 3 is configured for transmitting to the server 2 the transmitting request RTM for transmitting the manifest MA for each period of the periods.

The MPEG-DASH concept of periods would also allow to modify the portion setup/structure (for example the setup of tiles TI and objects) if needed e.g., scene cut to something that is completely different. However, the portion setup/structure may also be constant over time.

Depending on certain implementation requirements, embodiments of the inventive device and system can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE SIGNS

1 client
2 server
3 sending interface
4 reception interface
5 viewing direction receiving unit
6 stream selecting unit
7 receiving interface
8 transmitting interface
IVS immersive video scene
ST stream
TI tile
SR streaming request
RTM transmitting request
VD viewing direction
FV field of view
SST selected stream
MA manifest
PI portion information
SSI selected stream information
SVS spherical video scene
PO position
RD regional description
GS group of streams
QD quality description
SOS set of streams

REFERENCES

[1] Fabian Prada, Leandro Cruz, Luiz Velho: Improving Object Extraction With Depth-Based Methods, online available: http://www.visgraf.impa.br/Data/RefBib/PS_PDF/clei13/clei2013_81.pdf.

The invention claimed is:

1. Client configured for retrieving a video data representation of an immersive video scene streamed by a server using a streaming protocol, wherein the server is configured for providing a plurality of streams to the client, wherein each of the streams comprises a portion of the immersive video scene, the client comprising:
  a sending interface configured for sending requests concerning the immersive media scene to the server;
  a reception interface configured for receiving the video data representation of the immersive media scene streamed by the server;
  a viewing direction receiving unit configured for receiving a viewing direction of a user of the client, wherein the viewing direction indicates a field of view of the user; and
  a stream selecting unit configured for determining one or more selected streams of the plurality of streams;
  wherein the sending interface is configured for transmitting to the server a transmitting request for transmitting a manifest, which contains for each of the streams of the immersive video scene a portion information, which describes properties of the portion of the spherical immersive video scene comprised in the respective stream;
  wherein the reception interface is configured for receiving the manifest from the server;
  wherein the sending interface is configured for transmitting a streaming request for streaming the one or more selected streams as the video data representation of the immersive video scene, wherein the sending interface receives from the stream selecting unit a selected stream information identifying the one or more selected streams, wherein the selected stream information is created by the stream selecting unit based on the viewing direction of the user of the client and based on the manifest;
  wherein the server is configured for providing at least one of the plurality of streams at different qualities, wherein for each of the streams the properties described in the portion information comprise a quality description of the different qualities being available, wherein the stream selecting unit is configured for determining the quality for the at least one stream being available at different qualities based on the viewing direction of the user of the client and based on the manifest;

wherein the immersive video scene comprises at least one spherical video scene corresponding to a position of the user of the client, wherein the spherical video scene is split up into a plurality of tiles, wherein each of the tiles represents a regional portion of the spherical video scene, wherein each of the tiles is contained in one stream of the plurality of streams, wherein for each of the streams comprising one of the tiles, the properties described in the portion information comprise a description of the regional portion represented by the respective tile, wherein at least some tiles of the plurality of tiles are separated horizontally and/or vertically;

wherein the stream selecting unit is configured for including into the one or more selected streams a first group of streams of the plurality of streams, which comprise the one or more streams containing one of the tiles, which is at least partially inside of the field of view of the user, and a third group of the streams, which comprise at least some of the one or more streams containing one of the tiles, which is outside of the field of view of the user; and wherein the stream selecting unit is configured for determining the quality for the first group of streams and the quality for the third group of streams in such way that the quality of the first group of streams is higher than the quality of the third group of streams.

2. Client according to claim 1, wherein the stream selecting unit is configured for including into the one or more selected streams a fourth group of streams of the plurality of streams, which comprise at least some of the one or more streams containing one of the tiles, which is outside of the field of view of the user and farer away from the field of view than the tiles of the third group of the streams, and wherein the stream selecting unit is configured for determining the quality for the third group of streams and the quality for the fourth group of streams in such way that the quality of the fourth group of streams is lower than the quality of the third group of streams.

3. Client according to claim 1, wherein the immersive video scene comprises a plurality of spherical video scenes, wherein the spherical video scenes of the plurality of spherical video scenes correspond to positions of the user of the client in the immersive video scene, wherein each of the plurality of spherical video scenes consists of a set of streams of the plurality of the streams, wherein for each of the streams the properties described in the portion information comprise a description to which spherical video scene of the spherical video scenes the respective stream belongs, wherein the stream selecting unit is configured for including into the one or more selected streams at least one stream from a first set of the sets of streams, which corresponds to an actual first position of the positions, and at least one stream from a second set of the sets of streams, which corresponds to a second position of the positions, which is adjacent to the first position, wherein the at least one stream from the second set of streams corresponds to the at least one stream from the first set of streams, and wherein the stream selecting unit is configured for determining the quality for the first set of streams and the quality for the second set of streams in such way that the at least one stream of the first set of streams has a higher quality than the at least one stream of the second set of streams.

4. Client according to claim 1, wherein the stream selecting unit is configured for including into the one or more selected streams at least one stream of a third set of the sets of streams, which corresponds to a third position of the positions, wherein the third position is at the same side of the first position as the second position and farer away from the first position than the second position is away from the first position, wherein the at least one stream from the third set of streams corresponds to the at least one stream from the first set of streams, and wherein the stream selecting unit is configured for determining the quality for the second set of streams and the quality for the third set of streams in such way that the at least one stream of the third set of streams has a lower quality than the at least one stream of the second set of streams.

5. Client according to claim 1, wherein the stream selecting unit is configured for including into the one or more selected streams at least one stream of a fourth set of the sets of streams, which corresponds to a fourth position of the positions, which is adjacent to the first position and opposite of the second position, wherein the at least one stream from the fourth set of streams corresponds to the at least one stream from the first set of streams, and wherein the stream selecting unit is configured for determining the quality for the first set of streams and the quality for the fourth set of streams in such way that the at least one stream of the first set of streams has a higher quality than at least one stream of the fourth set of streams.

6. Client according to claim 2, wherein the stream selecting unit is configured for including into the one or more selected streams at least one stream of a fifth set of the sets of streams, which corresponds to a fifth position of the positions, wherein the fifth position is at the same side of the first position as the fourth position and farer away from the first position than the fourth position is away from the first position, wherein the at least one stream from the fifth set of streams corresponds to the at least one stream from the first set of streams, and wherein the stream selecting unit is configured for determining the quality for the fourth set of streams and the quality for the fifth set of streams in such way that the at least one stream of the fifth set of streams has a lower quality than the at least one stream of the fourth set of streams.

7. Client according to claim 1, wherein the manifest is a media presentation description for dynamic adaptive streaming over HTTP, wherein for each of the streams the portion information is integrated in the media presentation in an XML tag.

8. Client according to claim 1, wherein the immersive video scene comprises at least one spherical video scene corresponding to a position of the user of the client, wherein the spherical video scene is split up into a foreground and a background, wherein the foreground is contained in a fifth group of streams of the plurality of streams and the background is contained in a sixth group of streams of the plurality of streams, wherein for each of the streams, the properties described in the portion information comprise a description whether the respective stream belongs to the foreground or to the background, wherein the stream selecting unit is configured for including into the one or more selected streams those streams of the fifth group of streams, which are at least partially inside of the field of view of the user, are included in the one or more selected streams, and wherein the stream selecting unit is configured for not including into the one or more selected streams those streams of the fifth group of streams, which are outside of the field of view of the user.

9. Client according to claim 1, wherein the immersive video scene comprises at least one spherical video scene corresponding to a position of the user of the client, wherein the spherical video scene is split up into a foreground and a background, wherein the foreground is contained in a fifth group of streams of the plurality of streams and the background is contained in a sixth group of streams of the plurality of streams, wherein for each of the streams, the properties described in the portion information comprise a description whether the respective stream belongs to the foreground or to the background, wherein the stream selecting unit is configured for including into the one or more selected streams at least one stream of the fifth group of streams and at least one stream of the sixth group of streams, and wherein the stream selecting unit is configured for determining the quality for the fifth group of streams and the quality for sixth group of streams in such way at least one stream of the sixth group of streams has a lower quality than at least one stream of the fifth group of streams.

10. Client according to claim 6, wherein at least one stream of the fifth group of streams consists of a parametrically coded object.

11. Client according to claim 1, wherein the immersive video scene is structured into periods, wherein the sending interface is configured for transmitting to the server the transmitting request for transmitting the manifest for each period of the periods.

12. System for streaming a video data representation of an immersive video scene from a server to a client, wherein the client is configured according to claim 1 and wherein the server comprises:

a receiving interface configured for receiving requests concerning the immersive video scene from the client; and a transmitting interface having access to a plurality of streams, wherein each of the streams comprises a portion of the immersive video scene;

wherein the transmitting interface has access to a manifest, which contains for each of the streams of the immersive video scene a portion information, which describes properties of the portion of the immersive video scene comprised in the respective stream;

wherein the transmitting interface is configured for transmitting the manifest to the client in case that a transmitting request for transmitting the manifest from the client is received by the receiving interface;

wherein the receiving interface is configured for receiving from the client a streaming request for streaming one or more selected streams of the plurality of streams, wherein the one or more selected streams are determined by the client based on a viewing direction of the user of the client and based on the manifest; and wherein the transmitting interface is configured for streaming the one or more selected streams according to the transmitting request as the video data representation of the immersive video scene to the client using a streaming protocol in case that the streaming request from the client is received by the receiving interface.

13. Method for retrieving, by a client, a video data representation of an immersive video scene streamed by a server using a streaming protocol, wherein the server is configured for providing a plurality of streams to the client, wherein each of the streams comprises a portion of the immersive video scene, wherein the immersive video scene comprises at least one spherical video scene corresponding to a position of a user of the client, wherein the spherical video scene is split up into a plurality of tiles, wherein each of the tiles represents a regional portion of the spherical video scene, wherein each of the tiles is contained in one stream of the plurality of streams, wherein for each of the streams comprising one of the tiles, the properties described in a portion information comprise a description of the regional portion represented by the respective tile, wherein at least some tiles of the plurality of tiles are separated horizontally and/or vertically, the method comprising the steps:

sending, by a sending device, requests concerning the immersive media scene to the server;

receiving, by a reception interface, the video data representation of the immersive video scene streamed by the server;

receiving, by a viewing direction receiving unit, a viewing direction of a user of the client, wherein the viewing direction indicates a field of view of the user; and determining, by a stream selecting unit, one or more selected streams of the plurality of streams;

transmitting, by the sending interface, to the server a transmitting request for transmitting a manifest, which contains for each of the streams of the immersive video scene the portion information, which describes properties of the portion of the immersive video scene comprised in the respective stream;

receiving the manifest from the server by the reception interface;

transmitting, by the sending interface, a streaming request for providing one or more selected streams as the video data representation of the immersive video scene, wherein the sending interface receives from the stream selecting unit a selected stream information identifying the one or more selected streams, wherein the selected stream information is created by the stream selecting unit based on the viewing direction of the user of the client and based on the manifest;

providing, by the server, at least one of the plurality of streams at different qualities, wherein for each of the streams the properties described in the portion information comprise a quality description of the different qualities being available, determining, by the stream selecting unit, the quality for the at least one stream being available at different qualities based on the viewing direction of the user of the client and based on the manifest;

including, by the stream selecting unit, into the one or more selected streams a first group of streams of the plurality of streams, which comprise the one or more streams containing one of the tiles, which is at least partially inside of the field of view of the user, and a third group of the streams, which comprise at least some of the one or more streams containing one of the tiles, which is outside of the field of view of the user; and determining, by the stream selecting unit, the quality for the first group of streams and the quality for the third group of streams in such way that the quality of the first group of streams is higher than the quality of the third group of streams.

14. Computer-readable memory comprising a program for, when running on a processor, executing the method according to claim 13.

* * * * *